(12) United States Patent
Schicht et al.

(10) Patent No.: US 6,541,133 B1
(45) Date of Patent: Apr. 1, 2003

(54) LAYERED STACK FOR TRANSPARENT SUBSTRATES

(75) Inventors: Heinz Schicht, Bethau (DE); Uwe Schmidt, Falkenberg (DE); Wilfried Kaiser, Torgau (DE); Herbert Schindler, Torgau (DE); Rolf Pfannkuchen, Freiberg (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/582,077

(22) PCT Filed: Oct. 20, 1999

(86) PCT No.: PCT/FR99/02548

§ 371 (c)(1), (2), (4) Date: Jun. 22, 2000

(87) PCT Pub. No.: WO00/24686

PCT Pub. Date: May 4, 2000

(30) Foreign Application Priority Data

Oct. 22, 1998 (DE) .......................... 198 48 751

(51) Int. Cl.[7] .................................. B32B 9/04
(52) U.S. Cl. .................. 428/697; 428/432; 428/469; 428/472; 428/673; 428/699; 428/701; 428/702; 427/164

(58) Field of Search ................................ 428/426, 622, 428/629, 630, 632, 633, 673, 688, 702, 432, 469, 472, 697, 699, 701; 427/164

(56) References Cited

FOREIGN PATENT DOCUMENTS

| EP | 0 183 052 | 6/1986 |
| EP | 0 226 993 | 7/1987 |
| EP | 0 343 695 | 11/1989 |
| EP | 0 675 550 | 10/1995 |
| EP | 0 751 099 | 1/1997 |
| GB | 2 256 282 | 12/1992 |

*Primary Examiner*—Deborah Jones
*Assistant Examiner*—Andrew T Piziali
(74) *Attorney, Agent, or Firm*—Pennie & Edmonds LLP

(57) ABSTRACT

A layer stack for the surface coating of transparent substrates, in particular panes of glass, has at least one metal oxide composite layer produced by reactive cathodic sputtering and contains Zn oxide and Sn oxide. Relative to the total amount of metal, this metal oxide composite layer contains from 0.5 to 6.5% by weight of one or more of the elements Al, Ga, In, B, Y, La, Ge, Si, P, As, Sb, Bi, Ce, Ti, Zr, Nb and Ta. In a layer stack which has a silver layer as a functional layer, the metal oxide composite layer may be used as an upper and/or lower antireflection layer, as a diffusion barrier layer, as a sublayer of an antireflection layer and/or as an upper cover layer.

26 Claims, No Drawings

LAYERED STACK FOR TRANSPARENT SUBSTRATES

BACKGROUND OF THE INVENTION

The invention relates to a layer stack for transparent substrates, in particular for panes of glass, with at least one metal oxide composite layer produced notably by reactive cathodic sputtering from a metallic alloy target containing Zn and Sn. The substrates on which the layers are deposited may also be made of transparent organic polymers, and may be rigid or flexible. Rigid polymeric substrates may be chosen in the family of polycarbonates or among certains polyurethans. They may be in methylmetacrylate PMMA. Fexible substrates may be chosen for example in polyethyle terephtalate PET, a film which is afterwards laminated with two thermoplastic sheets (in polyvinyl butyral PVB for example) between two gass panes.

The patent applications EP 0183 052 and EP 0226 993 disclose high-transparency low-E layer stacks in which a metallic functional layer, in particular a thin silver layer, is embedded between two dielectric antireflection layers which are the oxidation product of a zinc/tin alloy. These dielectric oxide layers are sputtered using the method of magnetic field-enhanced reactive cathodic sputtering with an oxygen-containing working gas from a metallic target which consists of a Zn/Sn alloy. Depending on the Zn:Sn ratio, the oxide composite layer produced in this way will contain a greater or lesser amount of zinc stannate $Zn_2SnO_4$, which gives the layer particularly favourable properties especially in terms of mechanical and chemical stability. Zn:Sn alloys with a Zn:Sn ratio of from 46:54 to 50:50% by weight are preferably used as the target.

In the technical sputter process with industrial coating stacks, the sputtering of $Zn_2SnO_4$ layers from Zn/Sn alloy targets is more difficult than the sputtering of pure ZnO or $SnO_2$ layers. This is because, particularly at the start of the sputtering process, the material on the target and on parts of the sputter chamber lead to insulation effects, the consequences of which are defective products and therefore production rejects. Furthermore, alloy targets of this type must be operated with reduced sputtering rates, that is to say with reduced electrical power, because the target alloy has a lower melting temperature than the melting temperatures of the two components, especially in the region of the eutectic composition. The cooling of targets of this type must therefore be particularly intense. This can in turn be achieved only with targets of particular design, the production of which is comparatively expensive.

SUMMARY OF THE INVENTION

The object of the invention is, on the one hand, further to improve the mechanical and chemical properties of dielectric layers containing zinc stannate and, on the other hand, to reduce the difficulties which occur during the process of sputtering Zn/Sn alloys.

According to the invention, this object is achieved in that the metal oxide composite layer contains one or more of the elements Al, Ga, In, B, Y, La, Ge, Si, P, As, Sb, Bi, Ce, Ti, Zr, Nb and Ta.

It has been shown that, by the addition according to the invention of the said elements, which without exception are among the elements in main and subgroups III, IV and V of the Periodic Table, a considerable improvement is obtained in all the important layer properties, with an improvement in the efficiency during the sputter process as well.

DETAILED DESCRIPTION OF THE INVENTION

The mixed oxides created by the elements added according to the invention, for example by the addition of Al and Sb, have the qualitative composition $ZnO.ZnSnO_3.Zn_2SnO_4.ZnAl_2O_4.ZnSb_2O_6$ depending on the choice of the amounts of the metals Zn and Sn. On crystallization, some of these oxides form spinel structures, which per se crystallize with particularly dense atomic ordering. The improvements obtained in the layer properties can probably be explained by the particularly high packing density obtained for the spinel structures by the incorporation of the said added elements, while the favourable effect during the sputter process is probably attributable to the increase in the electrical conductivity of the mixed oxides which is obtained by the incorporation of the added elements. Owing to the dense crystal structure, the layers not only have particularly high mechanical and chemical stability, but also hinder diffusion processes into this layer or through this layer. This reduces the risk of the onset of modifications in the said layer or in any other layer of the stack which may be attributable to water molecules and oxygen and $Na^+$ and, where applicable (ie when the stack contains Ag layer(s)), $Ag^+$ diffusing in, especially during heat-treatment and storage processes.

For a maximally dense spinel structure, it is particularly favourable if the ionic radius of the added element is not too different from the ionic radius of $Zn^{2+}$ and $Sn^{4+}$, which have ionic radii of 0.83 angstrom ($Zn^{2+}$) and 0.74 angstrom ($Sn^{4+}$), respectively. This condition is satisfied, in particular, for the elements Al and Sb, with which the ionic radius of $Al^{3+}=0.57$ Å, and of $Sb^{5+}=0.62$ Å. On the other hand, as already mentioned, the incorporation of the said added elements into the at least partially crystallized layer increases the electrical conductivity of the oxide build-ups on the anode faces and walls of the coating chambers, as well as on the target surface itself. As a result, the operating times of the target during the sputter process are in turn improved considerably, so that not only an improvement in the layer properties, but also an improvement in the sputter process can be observed.

The amount of added elements according to the invention in the metal oxide composite layer is preferably from 0.5 to 6.5% by weight relative to the total amount of metal.

Compositions of the metal oxide composite layer which have been found to be particularly advantageous are those in which, in each case relative to the total amount of metal, the amount of Zn is from 35 to 70% by weight and the amount of Sn is from 29 to 64.5% by weight. For the production of this metal oxide composite layer, alloy targets having from 50 to 70%, notably 66 to 69% by weight Zn, from 29 to 50%, notably 29 to 32% by weight Sn and from 1 to 40% by weight Al or Sb (notably 1.5 to 30%) are preferably employed.

The metal composite layers according to the invention can in particular be used successfully in partially reflecting layer stacks with a metallic functional layer made of silver. In such layer stacks, they can be used both as a bonding or antireflection layer, as a condensation layer for silver layers deposited on top, as a blocker layer below or above the silver layers and as a sublayer in the region of the bottom and/or top layer of the layer stack.

Illustrative embodiments for layer stacks according to the invention will be described below, the properties respectively achieved being compared with the properties of a corresponding layer stack according to the prior art.

In order to assess the layer properties, ten different tests were carried out on all the samples, namely:

A Cracking hardness

In this case, a weighted needle is drawn over the layer at a defined speed. The weight under which traces of cracking can be seen is used as the measure of the cracking hardness.

B Cracking hardness after storage in water

Test procedure as in A, but after storing the samples in water at 20° C. for 30 min.

C Erichsen wash test according to ASTM 2486

Visual assessment

D Water condensation test (WCT)

The samples are exposed for 140 h to a temperature of 60° C. at 1000% relative humidity. Visual assessment.

E $Zn^{2+}$ leaching

The measurement is taken using the plate method according to Kimmel et al., Z. Glastechnische Berichte 59 (1986) p. 252 et seq. The test gives information about the hydrolytic resistance of layer stacks containing Zn.

F $Ag^+$ leaching

The measurement is again taken using the plate method according to Kimmel et al. used to determine the $Zn^{2+}$ leaching. The result of the measurement gives an analytical gauge of the density of the dielectric layers over the Ag layer.

G Hydrochloric acid test

In this case, the glass sample is dipped for 8 min in 0.01 n HCl at 38° C. and the % emissivity loss is established.

H Hydrochloric acid test, visual assessment

The glass sample is dipped as for G in hydrochloric acid. The assessment criterion used is what can be seen on the edge which is immersed.

I EMK Test

This test is described in Z. Silikattechnik 32 (1981) p. 216 "Untersuchungen zur elektrochemischen Prüfung dünner Metallschichten" [Studies of the electrochemical testing of thin metal layers]. It gives information about the passivating quality of the cover layer above the silver layer, and about the corrosion resistance of the Ag layer. The lower the potential difference (in mV) between the layer stack and the reference electrode, the better the layer quality.

K Water film test

The layer side of the samples is brought into contact for 24 h with a thin film of water. The test gives information about the storage stability of coated panes of glass stacked in a pile if traces of water enter between the panes of glass. The assessment is made visually.

COMPARATIVE EXAMPLE 1

In an industrial continuous magnetron stack, a layer stack according to the prior art, with the following layer sequence, was applied under customary coating conditions to 6 mm thick panes of float glass:

glass pane-40 nm $SnO_2$-2 nm CrNi-10 nm Ag-4 nm CrNi-37 nm $SnO_2$-3 nm $Zn_2SnO_4$.

The CrNi layers were sputtered from a target made of a CrNi alloy with 20% by weight Cr and 80% by weight Ni in an Ar atmosphere, while the $Zn_2SnO_4$ layer was reactively sputtered in an $Ar/O_2$ atmosphere from a target made of a Zn/Sn alloy with 52.4% by weight Zn and 47.6% by weight Sn.

During the deposition of the $Zn_2SnO_4$ layer, undesired electric arcs occurred at the start of the sputtering process, and these led to coating defects. Furthermore, impressions of the suckers used in the devices for stacking the panes of glass could be seen on the coated panes of glass.

The tests referred to under A to K were carried out on corresponding samples of the coated panes of glass. The results of the tests are collated in Table 1, together with the results of the tests carried out on corresponding illustrative embodiment 1.

ILLUSTRATIVE EMBODIMENT 1

In the same coating stack, and under the same coating conditions, a layer stack according to the invention, with the following layer sequence, was applied to 6 mm thick panes of float glass:

Glass-40 nm $SnO_2$-2 nm CrNi-10 nm Ag-4 nm CrNi -37 nm $SnO_2$ -3 nm $Zn_xSn_yAl_zO_n$.

The only difference from comparative example 1 consisted in the fact that the top cover layer of the layer stack was reactively sputtered from a target which consisted of an alloy having 68% by weight Zn, 30% by weight Sn and 2% by weight Al. During the sputtering of this top cover layer, no undesired electric arcs were observed. Furthermore, it was unexpectedly found that no undesired sucker impressions could be seen with this layer stack.

The test results obtained with this layer stack are given in Table 1 below:

TABLE 1

| Test | Comparative example 1 | Illustrative embodiment 1 |
|---|---|---|
| A (g) | 33 | 35 |
| B (g) | 35 | 55 |
| C (1000 strokes) | 1 medium, several small cracks | 1 small crack |
| D | pronounced reddening | very slight reddening |
| E (mg/25 ml) | 0.19 | 0.19 |
| F (mg/25 ml) | 0.47 | 0.03 |
| G (ΔE in %) | 1 | 0 |
| H | red streaks | no defects |
| I (mV) | 95.5 | 86 |
| K | no defects | no defects |

It can be seen from Table 1 that the layer stack according to the invention gives better results in almost all the tests than the layer stack according to the comparative example.

COMPARATIVE EXAMPLE 2

In the same coating stack, under comparable coating conditions, the following layer stack according to the prior art was again applied to 6 mm thick panes of float glass:

Glass pane-40 nm $SnO_2$-2 nm CrNi-10 nm Ag-4 nm CrNi-34 nm $SnO_2$-4 nm $Zn_2SnO_4$-4.5 nm $TiO_2$.

The $Zn_2SnO_4$ layer was again reactively sputtered from a metallic alloy target which consisted of 52.4% by weight Zn and 47.6% by weight Sn. During the sputtering of the $Zn_2SnO_4$ layer, undesired arcs were again observed, and these led to coating defects. The $TiO_2$ layer was reactively sputtered from a metallic titanium target with a DMS cathode and a working gas composed of an $Ar/O_2/N_2$ mixture.

The tests referred to under A to K were again carried out on samples of the coated panes of glass. The results are collated in Table 2, together with the test results found with the samples produced according to illustrative embodiment 2.

ILLUSTRATIVE EMBODIMENT 2

Under the same coating conditions, with the same coating stack, a layer stack according to the invention with the following layer sequence was applied with the same coating stack to 6 mm thick panes of float glass:

Glass-40 nm $SnO_2$-2 nm CrNi-10 nm Ag-4 nm CrNi-34 nm $SnO_2$-4 nm $Zn_xSn_ySb_zO_n$-4.5 nm $TiO_2$.

The only difference from the comparative example consisted in the fact that, in order to produce the sublayer containing the Zn/Sn mixed oxide, the target used was made of an alloy consisting of 68% by weight Zn, 30% by weight Sn and 2% by weight Sb. No undesired arcs were observed during the sputtering of this alloy.

Samples of the coated panes of glass were subjected to the tests referred to under A to K. The results are collated in Table 2 below, together with the results obtained with the samples of comparative example 2.

TABLE 2

| Test | Comparative example 2 | Illustrative embodiment 2 |
|---|---|---|
| A (g) | 30 | 45–50 |
| B (g) | 35 | 55 |
| C (1000 strokes) | 1 medium crack | 1 small crack |
| D  140 hours | weak reddening | still no defects after 400 h |
| E (mg/25 ml) | 0.19 | 0.15 |
| F (mg/25 ml) | 0.35 | 0.01 |
| G (ΔE in %) | 1 | 0 |
| H | red streaks | no defects |
| I (mV) | 80 | 30 |
| K | no defects | no defects |

The test results show that the $TiO_2$ cover layer has better compatibility with the composition layer according to the invention than with the zinc stannate layer of the comparative example. This is manifested by a further improvement in the test results, in particular in the substantially better results in test D (water condensation test) and in a significant improvement to the EMF test result. The result of the Ag* leaching is also substantially better, and this layer stack thus has outstanding quality overall.

COMPARATIVE EXAMPLE 3

In the same coating stack, the following layer stack was once more applied under comparable coating conditions to 6 mm thick panes of float glass as comparative samples:

Glass-20 nm $SnO_2$-17 nm ZnO-11 nm Ag-4 nm $TiO_2$-40 nm $SnO_2$.

This layer stack is a tried and tested layer stack according to the prior art.

The tests referred to under A to K were also carried out on samples of the panes of glass coated with this layer stack. The test results are once more collated in Table 3 together with the test results found with samples produced according to illustrative embodiment 3.

ILLUSTRATIVE EMBODIMENT 3

Under coating conditions comparable with those in comparative example 3, a layer stack according to the invention with the following layer sequence was applied with the same coating stack to 6 mm thick panes of float glass:

Glass-20 nm $SnO_2$-17 nm ZnO-11 nm Ag-1 nm Ti-3 nm $Zn_xSn_yAl_zO_n$-40 nm $SnO_2$.

In this case, the metal oxide composite layer according to the invention thus serves together with the very thin Ti layer arranged directly on the silver layer as a blocker layer.

The results of the tests carried out on corresponding samples are likewise reported in Table 3.

TABLE 3

| Test | Comparative example 3 | Illustrative embodiment 3 |
|---|---|---|
| A (g) | 4.5 | 7.5 |
| B (g) | 4.5 | 8 |
| C (350 strokes) | 2 small scratches | no scratches |
| D  70 hours | red spots | no defects |
| E (mg/25 ml) | 0.80 | 0.30 |
| F (mg/25 ml) | 0.60 | 0.20 |
| G (ΔE in %) | 8 | 1 |
| H | red streaks | no defects |
| I (mV) | 210 | 130 |
| K | no defects | no defects |

Comparing the test results shows that considerable improvements are also observed in both the chemical and the mechanical properties in the case when the layer according to the invention is used as a blocker layer.

As a conclusion, the composite layers according to the invention make it possible both to simplify the deposition process and to increase the chemical and mechanical durability of the stacks which incorporate them, especially when the layer of the invention are the last or just below the last layer of the stack (the outermost one). This kind of layer makes it possible to render more resistant stacks of layers using as dielectric layers metallic oxide, rendering their durability closer to the durability of stacks using instead dielectric layers made of nitride like silicon nitride. It seems that the gain in durability is still higher if Sb is chosen rather than Al in the composite oxide layer.

The invention may be used for glass substrates or any other transparent substrates, notably made of organic polymers as reminded in the preamble of the application.

The layers of the invention may be used as thin overcoat layer for protection purpose, or as a "blocker" layer (this terl means that the layer protects the functional layer, in metal like Ag, from deterioration due to the deposition of the following layer in metallix oxide by reactive sputtering in presence of oxygen), for example in a thickness range of about 2 to 6 nm. The thickness may be greater, for instance from 7 to 50 nm, if they are used to play a significant optical role.

The layers of the invention may be incorporated in many stacks of thin, interferential layers, notably in stacks having a functional layer with anti-solar properties or which is a low-emissive one, like Ag layer(s). The stack may contain one or several Ag layers, as described in EP 638 528, EP 718 250, EP 844 219, EP 847 965, FR98/13249 and FR/98/13250. The stack may also contain another kind of functional layer, for example in metal like an Ni-Cr alloy or steel as described in EP 511 901, or in nitride like TiN or ZrN.

The dielectric layer of the invention may be part of an anti-reflecting stack of layers, as descibed in EP 728 712 or WO 97/43224, or any other stack of layers having a thermal, optical, electrical function and usind dielectric/oxide layers having a refractive index around 2.

The substrates may also be used to produce monolithic (a singne substrate), laminated or multipel glazings (double glazing, windshield . . . ). They may be mounted in buildings, in vehicles, for diplay panels . . .

As an illustration, herebelow some stacks of layers incorporating a layer according to the invention Transparent substrate/$SnO_2$/ZnO/Ag/optional blocker, like NiCr/$SnO_2$/ZnSnO:Al or Sb Transparent substrate/$SnO_2$/ZnO/Ag/optional blocker like NiCr or Ti/$SnO_2$/$SiO_2$/$SnO_2$/ZnSnO: Al or Sb The stacks may contain two Ag layers.

To be underlined also that the amounts in added metal like Al or Sb in the metallic target are approxilately the same ones as those in the layers obtained from the target.

The stacks may of course contain several layers according to the invention, notably a blocker one and an overcoat one.

We claim:

1. In a layer stack for transparent substrates with at least one metal oxide composite layer produced by reactive cathodic sputtering from a metallic alloy target containing Zn and Sn, the improvement wherein the metal oxide composite layer contains one or more of the elements Al, Ga, In, B, Y, La, Ge, Si, P, As, Sb, Bi, Ce, Ti, Zr, Nb and Ta and has a thickness from about 2 to 6 nm.

2. Layer stack according to claim 1, wherein the amount of the elements Al, Ga, In, B, Y, La, Ge, Si, P, As, Sb, Bi, Ce, Ti, Zr, Nb and/or Ta in the metal oxide composite layer relative to the total amount of metal is from 0.5% to 6.5% by weight.

3. Layer stack according to claim 1, wherein the metal oxide composite layer contains from 35 to 70% by weight Zn and from 29 to 64.5% by weight Sn, in each case relative to the total amount of metal.

4. Layer stack according to claim 3, wherein the metal oxide composite layer contains from 66 to 69% by weight Zn, from 29 to 32% Sn and from 1 to 4% by weight Al or Sb.

5. Layer stack according to claim 1, wherein the metal oxide composite layer defines at least one of a lower and an upper antireflection layer of a layer stack having one or more functional layers made of a metal.

6. Layer stack according to claim 1, wherein the metal oxide composite layer is a diffusion barrier layer in a multilayer stack.

7. Layer stack according to claim 1, wherein the metal oxide composite layer is a sublayer of at least one of a lower and an upper antireflection layer.

8. Layer stack according to claim 7, having a layer sequence of substrate —$SnO_2$—Me—Ag—Me—$SnO_2$—$Zn_xSn_yAl_zO_n$, wherein Me defines a blocker metal or blocker metal alloy.

9. Layer stack according to claim 7, having a layer sequence of substrate —$SnO_2$—Me—Ag—Me—$Zn_xSn_yAl_zO_n$—$SnO_2$, wherein Me is a metal or metal oxide comprising Ti, Ta, Zr or CrNi.

10. Layer stack according to claim 1, having the sequence SnO2/ZnO/Ag/optional blocker/SnO2/ZnSnO:Al or Sb or the sequence SnO2/ZnO/Ag/optional blocker/SnO2/SiO2/SnO2/ZnSnO:Al or Sb.

11. Layer stack according to claim 1, wherein the stack further comprises at least a metal, metal alloy, or metal nitride functional layer.

12. Layer stack according to claim 1, wherein the stack has an anti-solar, low emissivity anti reflecting or electrical function.

13. Layer stack according to claim 1, wherein the composite layer has a spinelle structure.

14. Transparent substrate in glass or polymeric material, rigid or flexible, coated on at least one of its faces by a stack of layers according to claim 1.

15. Monolithic, laminated or multiple glazing incorporating the transparent substrate according to claim 14.

16. Process for producing a stack of layers for transparent substrates with at least one metal oxide composite layer of a metallic alloy containing Zn and Sn, wherein the metal oxide composite layer contains one or more of the elements Al, Ga, In, B, Y, La, Ge, Si, P, As, Sb, Bi, Ce, Ti, Zr, Nb and Ta and wherein the composite layer is deposited to a thickness from about 2 to 6 nm by reactive sputtering from a metallic target which contains Zn, Sn and at least one of the following elements: Al, Ga, In, B, Y, La, Ge, Si, P, As, Sb, Bi, Ce, Ti, Zr, Nb, and Ta.

17. Layer stack according to claim 5, wherein at least one of the one or more functional layers is a silver layer.

18. Layer stack according to claim 6, further comprising at least one metal, metal alloy, or metal nitride functional layer.

19. Layer stack according to claim 7, further comprising at least one metal, metal alloy, or metal nitride functional layer.

20. Layer stack according to claim 18, wherein the metal oxide composite layer has a spinelle structure.

21. Layer stack according to claim 19, wherein the metal oxide composite layer has a spinelle structure.

22. Layer stack according to claim 18, wherein the one or more elements comprises Al, Sb, or both.

23. Layer stack according to claim 19, wherein the one or more elements comprises Al, Sb, or both.

24. Layer stack according to claim 22, wherein the at least one functional layer comprises a silver layer.

25. Layer stack according to claim 23, wherein the at least one functional layer comprises a silver layer.

26. Layer stack according to claim 1, wherein the metal oxide composite layer does not contain hydrogen or fluorine.

* * * * *